United States Patent
Pasternack (10) Patent No.: US 11,017,046 B2
(45) Date of Patent: May 25, 2021

(54) COUNTER WITH OBSOLESCENCE OF OUTDATED VALUES

(71) Applicant: Microsoft Technology Licensing, LLC, Redmond, WA (US)

(72) Inventor: Jeffrey William Pasternack, Belmont, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 169 days.

(21) Appl. No.: 16/297,817

(22) Filed: Mar. 11, 2019

(65) Prior Publication Data

US 2020/0293585 A1    Sep. 17, 2020

(51) Int. Cl.
  *G06F 16/9535*    (2019.01)
  *G06F 40/30*     (2020.01)
  *G06F 40/232*    (2020.01)
  *G06F 40/263*    (2020.01)

(52) U.S. Cl.
  CPC ........ *G06F 16/9535* (2019.01); *G06F 40/232* (2020.01); *G06F 40/263* (2020.01); *G06F 40/30* (2020.01)

(58) Field of Classification Search
  None
  See application file for complete search history.

(56) References Cited

U.S. PATENT DOCUMENTS

| | | | | |
|---|---|---|---|---|
| 8,083,675 | B2* | 12/2011 | Robinson | G09B 7/02 600/300 |
| 2010/0306249 | A1* | 12/2010 | Hill | G06Q 50/01 707/769 |
| 2014/0058723 | A1* | 2/2014 | Shen | G06F 40/247 704/9 |
| 2014/0219413 | A1* | 8/2014 | Wallner | G01R 31/3181 377/112 |
| 2015/0088665 | A1* | 3/2015 | Karlsson | G06Q 30/0275 705/14.71 |
| 2015/0270975 | A1* | 9/2015 | Buckley | H04W 12/06 713/156 |
| 2020/0293585 | A1* | 9/2020 | Pasternack | G06F 16/9535 |
| 2020/0334584 | A1* | 10/2020 | Petroulas | G06Q 20/127 |

* cited by examiner

*Primary Examiner* — Kim T Nguyen (74) *Attorney, Agent, or Firm* — Schwegman Lundberg & Woessner, P.A.

(57) ABSTRACT

Methods, systems, and computer programs are presented for managing counters with automatic obsolescence of outdated values. One method includes operations for initializing a counter at a first time, and receiving, at a second time, a request to add a value to the counter. Further, a time period corresponding to the second time is calculated, as well as a promotion factor based on the time period. The method further includes calculating an incremental value based on the received value and the promotion factor, and adding the incremental value to the counter. Additionally, a prediction or estimate is based on a current value of the counter, such as identifying areas of interest for a user on an online service, identifying languages spoken by the user, strength of connections between users, determining if the user is actively searching for a new job, and so forth.

20 Claims, 9 Drawing Sheets

COUNTER WITH OBSOLESCENCE OF OUTDATED VALUES

TECHNICAL FIELD

The subject matter disclosed herein generally relates to methods, systems, and machine-readable storage media for logging data with an automatic mechanism to obsolete outdated values.

BACKGROUND

Many computer systems log the behavior of the system in different ways, such as measuring one or more parameters related to the system's performance. The parameters are updated over time as certain events happen, such as a user sending a message, a user receiving a message, a user making a phone call, a user speaking in multiple languages, and so forth. Some of the performance metrics are related to recent events, while the occurrence of older events carries little or no weight. That is, the system aims at forgetting older events while giving more importance to newer events.

However, discarding old information may be complicated because it requires keeping timestamps of the events to determine when some events can be discarded or forgotten. In large systems, with millions of users and hundreds or thousands of variables being logged per user, keeping timestamps becomes unrealistic as it would heavily tax the performance of the system.

In some cases, updating certain parameters requires reading data from the database, updating the data, and then writing the new data to the database. This double access to the database increases the amount of resources consumed by the system for performance monitoring purposes.

What is needed is a system that can easily monitor system events with an easy mechanism to discard, or minimize the effects of, old events.

BRIEF DESCRIPTION OF THE DRAWINGS

Various ones of the appended drawings merely illustrate example embodiments of the present disclosure and cannot be considered as limiting its scope.

DETAILED DESCRIPTION

Example methods, systems, and computer programs are directed to managing counters with automatic obsolescence of outdated values. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Computer systems utilize counters for monitoring certain events. For example, counters may log the number of times a user reads articles in several languages. In some cases, it is desirable to discount older values and give higher prominence to newer interactions; that is, a system can "forget" older interactions. Therefore, if a user read articles in German five years ago, but the user has not read any article in German within the last five years, the system wants to avoid showing articles in German to the user assuming that the user is not interested, does not speak Gelman very well, or has some other reason to ignore articles in German.

Prior solutions may keep timestamps together with the values of the counters, but in a system with millions of users and hundreds or thousands of counters, it becomes pragmatically infeasible to keep timestamps due to the large amount of computing resources required to store and update the counters.

In some embodiments, counters that count time-sensitive events are implemented by applying a discount factor to older values based on the amount of time elapsed. Or, seen from a different perspective, as time goes by, increments to the counters are modified by a promotion factor that continues growing over time. This way, newer updates to the counters have more weight than older updates to the counters, which means that older increments to the counters are discounted. Additionally, updates to the counters do not require reading the counter, updating its value, and then storing the updated value. Instead, a single add operation is sent to the database that stores the counter, resulting in a more efficient system.

These counters with time-sensitive functionality include at least two benefits: depreciating the effect of older counter updates over time and implementing the depreciation with a single database-add operation.

The use of counters, or other variables, with time-sensitive functionality may be used for a plurality of applications, such as identifying areas of interest for a user on an online service, identifying languages spoken by the user, strength of connections between users, determining if the user is actively searching for a new job, and so forth.

Figure 1:
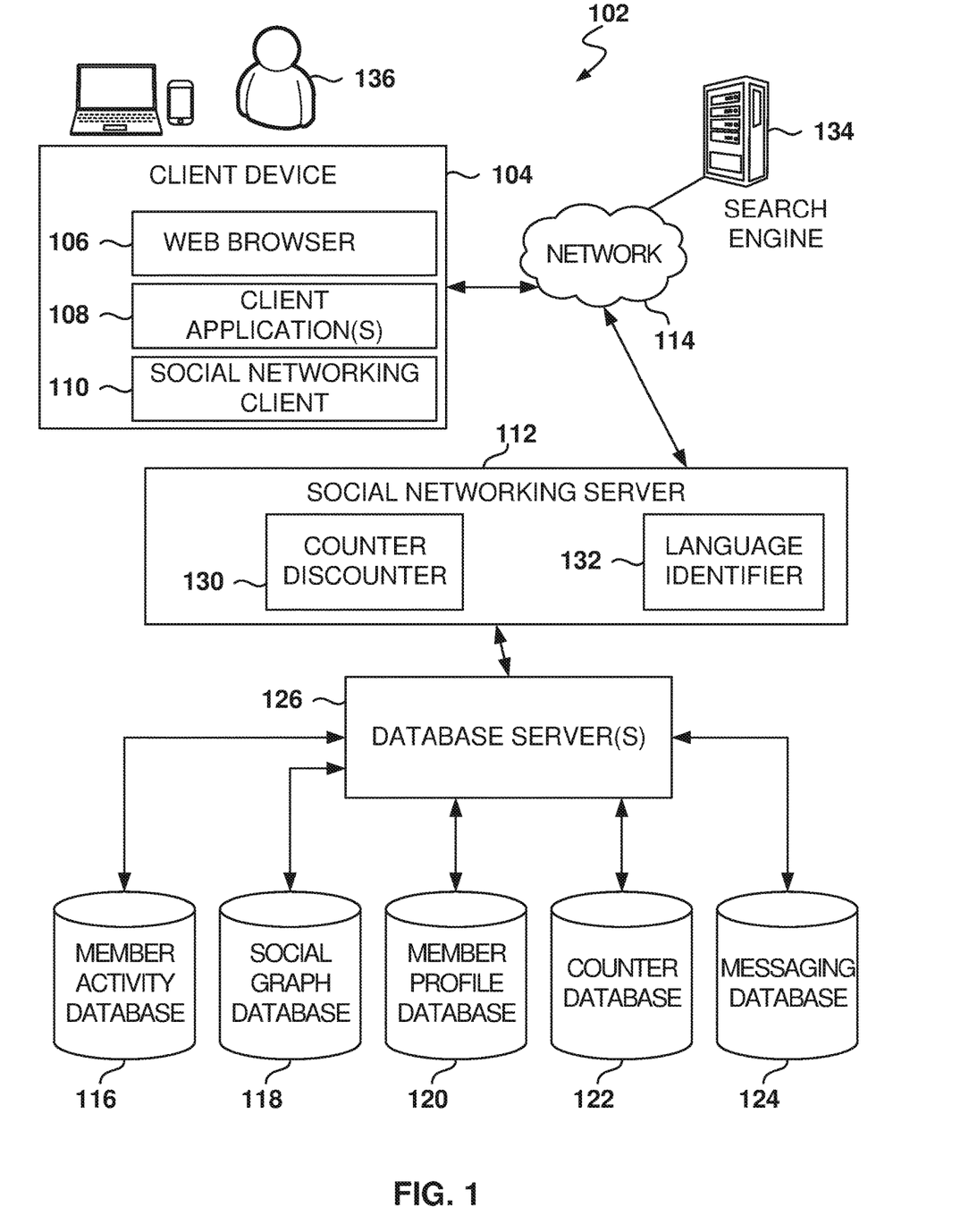
FIG. 1 is a block diagram illustrating a networked system, according to some example embodiments.

FIG. 1 is a block diagram illustrating a networked system, according to some example embodiments, including a social networking server 112, illustrating an example embodiment of a high-level client-server-based network architecture 102. Embodiments are presented with reference to an Internet service, but the principles used herein may be used for any online service accessed by members, such as a social networking service.

The social networking server 112 provides server-side functionality via a network 114 (e.g., the Internet or a wide area network (WAN)) to one or more client devices 104. FIG. 1 illustrates, for example, a web browser 106, client application(s) 108, and a social networking client 110 executing on a client device 104. The social networking server 112 is further communicatively coupled with one or more database servers 126 that provide access to one or more databases 116-124.

The client device 104 may comprise, but is not limited to, a mobile phone, a desktop computer, a laptop, a portable digital assistant (FDA), a smart phone, a tablet, a netbook, a multi-processor system, a microprocessor-based or programmable consumer electronic system, or any other communication device that a member 136 may utilize to access the social networking server 112. In some embodiments, the client device 104 may comprise a display module (not shown) to display information (e.g., in the form of user interfaces). In further embodiments, the client device 104 may comprise one or more of touch screens, accelerometers, gyroscopes, cameras, microphones, Global Positioning System (GPS) devices, and so forth.

In one embodiment, the social networking server 112 is a network-based appliance that responds to initialization requests or search queries from the client device 104. One or more members 136 may be a person, a machine, or other means of interacting with the client device 104. In various embodiments, the member 136 is not part of the network architecture 102 but may interact with the network architecture 102 via the client device 104 or another means.

The client device 104 may include one or more applications (also referred to as "apps") such as, but not limited to, the web browser 106, the social networking client 110, and other client applications 108, such as a messaging application, an electronic mail (email) application, a news application, and the like. In some embodiments, if the social networking client 110 is present in the client device 104, then the social networking client 110 is configured to locally provide the user interface for the application and to communicate with the social networking server 112, on an as-needed basis, for data and/or processing capabilities not locally available (e.g., to access a member profile, to authenticate a member 136, to identify or locate other connected members 136, etc.). Conversely, if the social networking client 110 is not included in the client device 104, the client device 104 may use the web browser 106 to access the social networking server 112.

Further, while the client-server-based network architecture 102 is described with reference to a client-server architecture, the present subject matter is of course not limited to such an architecture, and could equally well find application in a distributed, or peer-to-peer, architecture system, for example.

In addition to the client device 104, the social networking server 112 communicates with the one or more database servers 126 and databases 116-124. In one example embodiment, the social networking server 112 is communicatively coupled to a member activity database 116, a social graph database 118, a member profile database 120, a counter database 122, and a messaging database 124. The databases 116-124 may be implemented as one or more types of databases including, but not limited to, a hierarchical database, a relational database, an object-oriented database, one or more flat files, or combinations thereof The member profile database 120 stores member profile information about members 136 who have registered with the social networking server 112. With regard to the member profile database 120, the member 136 may include an individual person or an organization, such as a company, a corporation, a nonprofit organization, an educational institution, or other such organizations.

In some example embodiments, when a member 136 initially registers to become a member 136 of the social networking service provided by the social networking server 112, the member 136 is prompted to provide some personal information, such as name, age (e.g., birth date), gender, interests, contact information, home town, address, spouse's and/or family members' names, educational background (e.g., schools, majors, matriculation and/or graduation dates, etc.), employment history (e.g., companies worked at, periods of employment for the respective jobs, job title), professional industry (also referred to herein simply as "industry"), skills, professional organizations, and so on. This information is stored, for example, in the member profile database 120. Similarly, when a representative of an organization initially registers the organization with the social networking service provided by the social networking server 112, the representative may be prompted to provide certain information about the organization, such as a company industry. This information may be stored, for example, in the member profile database 120.

As members 136 interact with the social networking service provided by the social networking server 112, the social networking server 112 is configured to monitor these interactions. Examples of interactions include, but are not limited to, commenting on posts entered by other members 136, viewing member profiles, editing or viewing a member 136's own profile, sharing content outside of the social networking service (e.g., an article provided by an entity other than the social networking server 112), updating a current status, posting content for other members 136 to view and comment on, posting job suggestions for the members 136, searching job postings, and other such interactions. In one embodiment, records of these interactions are stored in the member activity database 116, which associates interactions made by a member 136 with his or her member profile stored in the member profile database 120. The messaging database 124 stores messages exchanged among users.

The counter database 122 includes a plurality of counters utilized by the social networking server. The counters are used to log the occurrence of events associated with the users 136 to measure performance and identify user features, such as languages spoken, skills, areas of interest, frequency of access, frequency of communication, frequency of engagement on the social networking service, identification of most-frequently contacted members, number of jobs applied to, number of job postings read, number of messages from recruiters, participation in group activities, and so forth.

Some of the embodiments are presented with reference to identifying user language skills, but the same principles may be applied to other areas, such as identifying language or languages used in a messaging board, determining if the user is actively searching for employment, determining a level of interest by recruiters on the skills possessed by the user, level of engagement (e.g., number of accesses per week) of the user with the social networking service, number of job postings read, number of messages received from recruiters, level of participation in group activities, amount of time spent on the social networking service, current interests of the user (e.g., the user likes to see articles on machine learning), and so forth.

Many of these applications relate to the analysis of recent activities and therefore older activities need to be discounted or forgotten. For example, if the user was actively searching for a job earlier that year, but the user has not searched for employment recently, it would be invalid to say that the user was actively searching for employment by looking at the data from a year earlier. By discounting the value of counters, the older data becomes less relevant over time.

While the database server(s) 126 are illustrated as a single block, one of ordinary skill in the art will recognize that the database server(s) 126 may include one or more such servers. Accordingly, and in one embodiment, the database server(s) 126 implemented by the social networking service are further configured to communicate with the social networking server 112.

The social networking server 112 includes, among other modules, a counter discounter 130 and a language identifier 132. More details regarding the functionality of these modules is provided below. Each of the modules may be implemented in software, hardware, or any combination of software and hardware.

The network architecture 102 may also include a search engine 134. Although only one search engine 134 is depicted, the network architecture 102 may include multiple search engines 134. Thus, the social networking server 112 may retrieve search results (and, potentially, other data) from multiple search engines 134. The search engine 134 may be a third-party search engine.

Figure 2:
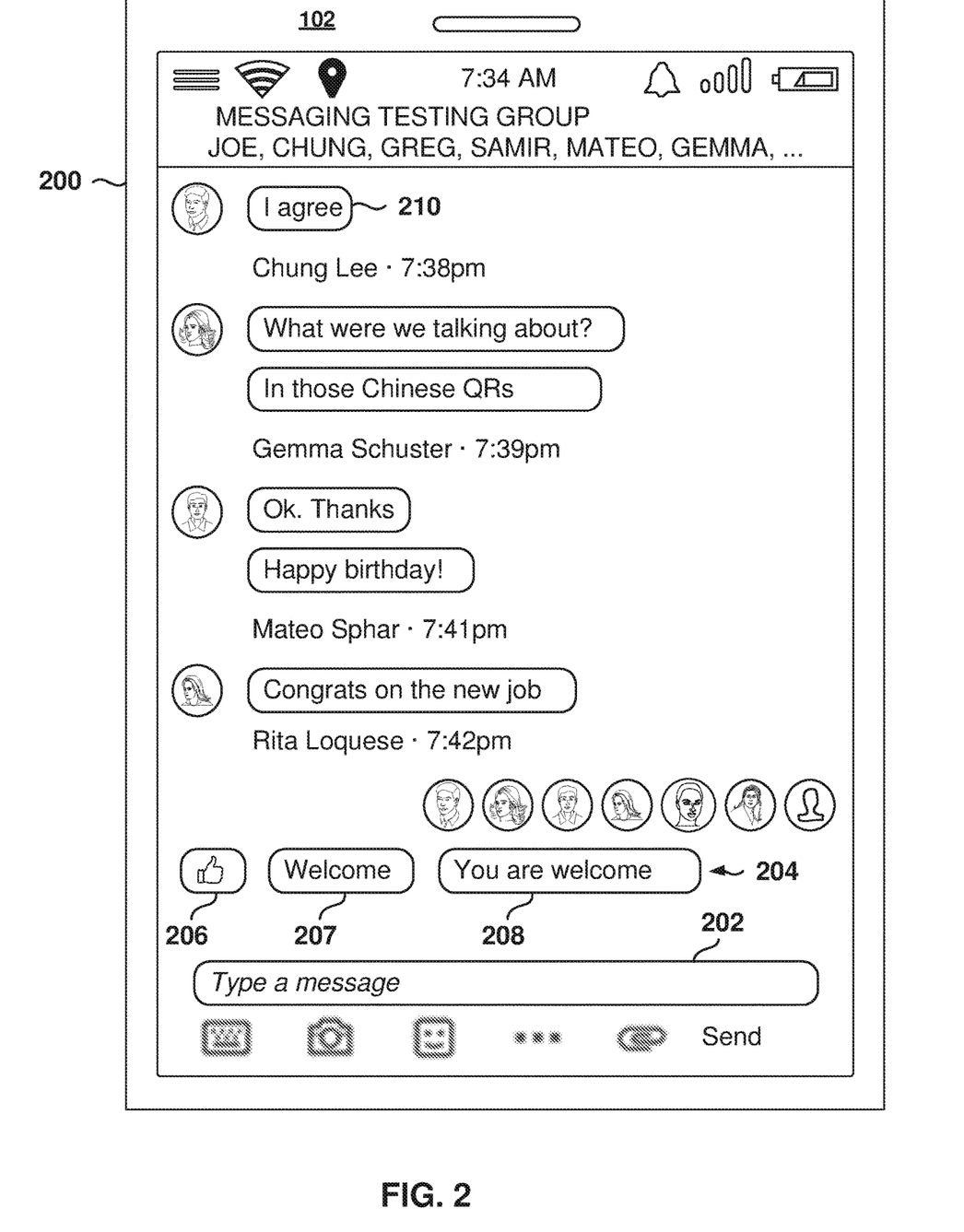
FIG. 2 is a screenshot of a messaging interface including a set of recommended response messages, according to some example embodiments.

FIG. 2 is a screenshot of a messaging interface 200 including a set of recommended response messages 204, according to some example embodiments. As shown, the messaging interface 200 shows a history of messages (e.g., message 210) transmitted between multiple users as part of a communication session. In this example, the most recent message received as part of the communication session is the phrase 'Congrats on the new job.'

The messaging interface 200 includes a text field 202, which a user can utilize to type a new message, such as "you're welcome." The messaging interface 200 also includes a set of three recommended response messages 204, which a user can select as a response and it will be entered in the messaging interface as if the user had typed or had selected an icon. As shown, the recommended response messages 204 include a thumbs-up emoticon 206, a "Welcome" message 207, and a "You are welcome" message 208. Although three recommended messages are shown, other embodiments may include fewer or more recommendations. Rather than use the text field 202 to manually type out a response, the user can select one of the recommended replies 204 with a single input to respond to the message.

In some example embodiments, language counters are utilized to determine the languages used by users within the particular message group. Each time there is an interaction, the system determines the language used for the input (e.g., English, Spanish, French) and then the counter for the language identified is incremented.

The counter may be incremented immediately or may be incremented periodically in batches to reduce the number of interactions with the databases storing the counters. For example, the number of interactions in a day may be saved in memory and, at the end of the day, the corresponding counters in the database are updated. This way, only the counters being used need to be kept in memory and the counters not being used do not consume memory space in the server memory.

Figure 3:
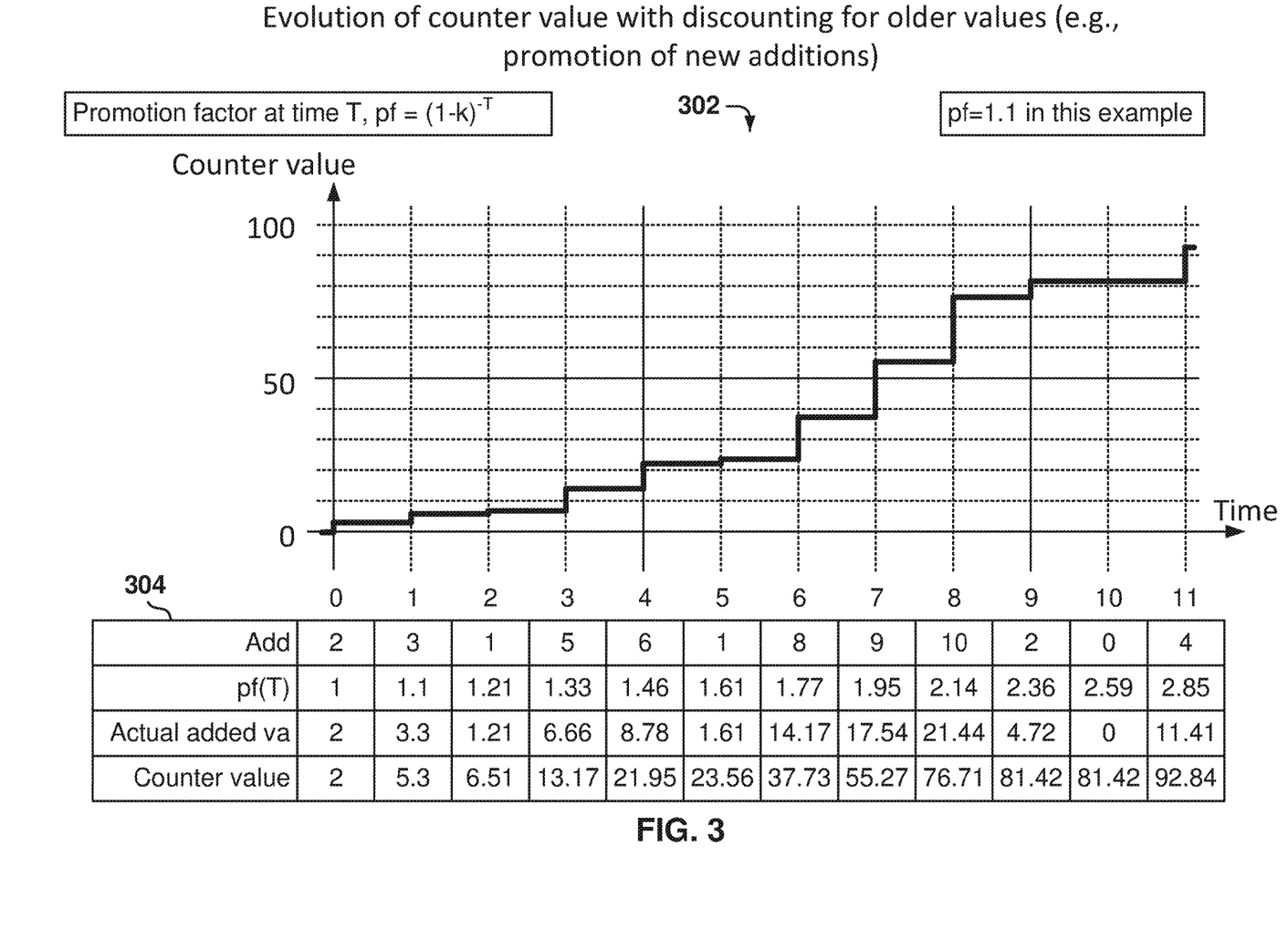
FIG. 3 illustrates the evolution of the body of the counter with discounting of older values, according to some example embodiments.

FIG. 3 illustrates the evolution of the body of the counter with discounting of older values, according to some example embodiments. If a user utilizes English all the time while interacting with the social networking service, it can be deduced that the next interaction will most likely be in English. However, there are multilingual users that may interact in multiple languages and the system has to account for the possibility of interactions in multiple languages.

Knowing the language used is important because it helps in determining the content of the message. For example, if a user enters "yo," the message may be interpreted as a colloquial form of hello in English or as the pronoun "I" in Spanish.

Further, knowing the language used by a user is important because it assists the social networking service in determining the content that may be presented to the user. If the user does not speak German, then it does not make sense to show content in German, but if the user speaks English and Spanish, articles in both English and Spanish may be candidates for presentation to the user. Also, knowing the language used by a user assists in prioritizing communications presented in a user feed.

Some solutions analyze user profile data to determine the languages spoken by a user, such as places where the user has lived or studied, and the like. But this approach has its shortcomings. For example, if the user has studied English while living in Germany, it may be difficult to determine that the user speaks English. Also, a user may have lived abroad (e.g., study abroad) for a while but still may not have mastered the language spoken in the foreign country.

Further, a multilingual user may not be interested in interactions in a certain language. For example, the user may only want to read articles in English. By analyzing the interaction patterns of the user, it can be determined that the user is not interested in articles in other languages. Maybe the user was interested in articles in French five years earlier before a trip to France, but the user is not interested anymore. By using counters with time discounting, the service determines the interest of the user when it relates to one or more languages.

A counter with time discounting may be implemented by updating the counter based on the timed entries. For example, a counter was incremented by five six periods earlier (e.g., six months ago), and now the counter is being incremented by one. In this approach, the counter would be read and the value of the counter reduced based on the time passed (e.g., $5 \times 0.95^6$) and then incremented by two. The result is then stored back on the database to update the counter. The problem with this approach is that it requires keeping track of time and updating the counter, which requires both read and write database operations. For a system with thousands or millions of counters, accessing the database twice may tax the system resources.

Embodiments presented herein present counters with time discounting that do not require logging the times when the counter was updated, and updating the counters requires a single database operation.

In some example embodiments, a value to be added va to the counter is received at time t. First, the time period T for time t is calculated as follows:

$$T = (t - t_0) \bmod P \qquad (1)$$

Here, to is a time origin and P determines the duration of a period (e.g., day, week, month, year). Further, a discounting factor k is used to lower the effect of older increments of the counter. The following equation is used to calculate va at time t.

$$va = \frac{n}{(1-k)^T} \quad (2)$$

The discount factor k is greater than 0 and less than 1. Therefore, va will be greater than n after the first period. Although it was said that the discount factor is used to lower the effect of older increments, in reality, the newer increments to the counter are inflated and they are inflated more and more as time goes by. This provides the same effect as discounting older updates.

Additionally, a promotion factor pf(T) for each period is defined as the multiplier of n for calculating the va. The promotion factor pf(T) is based on the discount factor k and the time period T as follows:

$$pf(T) = \frac{1}{(1-k)^T} \quad (3)$$

Thus, the new updates are inflated based on the promotion factor. Equation (2) may be rewritten as follows:

$$va = n \times pf(T) \quad (4)$$

In some example embodiments, the counters utilize the same time origin $t_0$. Therefore, the pf(T) is calculated once for the current period and all the counters will use the same promotion factor pf(T) during that period.

The example illustrated in FIG. 3 shows a table 304 with values to be added on the first row at different time periods shown above the table 304. In this example, the promotion factor is 1.1. The second row of table 304 shows the values of pf(T) over time, that is, pf(0), pf(1), pf(2), pf(3), etc., which are equal to $1.1^0$, $1.1^1$, $1.1^2$, etc., or 1, 1.1, 1.21, 1.33, etc.

The actual value added va is shown on the third row and is calculated by multiplying n in the first row times pf(T) in the second row. The last row shows the value of the counter after adding va. This value is then added to the counter value of the database in a single database-access operation (e.g., add (counter c, va)). A read operation of the counter is not required to update the value of the counter.

A chart 302 illustrates the evolution of the counter over time. It can be observed that, as times go by, the increments have a bigger effect on the counter. For example, at periods 0 and 9, the same value of 2 is to be added. However, at period 0 the va is 2, while at period 9 the va is 4.72.

It is noted that using counters with time discounting, as described above, does not require storing times when the counters were updated previously, such as the last time that the counter was updated. Using the pf that varies over time provides an embedded mechanism for controlling the value of updates over time.

Besides the exponential evolution of pf(T), as shown in equation (3), other embodiments may utilize equations, such as a linear evolution, logarithmic evolution, polynomial evolution, and the like, or a combination thereof. Here are examples of other possible equations for calculating pf(T):

$$pf(T) = a \times T, \text{ where } a > 1 \quad (5)$$

$$pf(T) = a \times T^3 + b \times T^2 + c \times T \quad (6)$$

$$pf(T) = 1 + \text{int}(\log(T)) \quad (7)$$

$$pf(T) = 1/(1-k)^{T/3} \quad (8)$$

$$pf(T) = a \times T + b^{T/2} \quad (9)$$

Thus, the embodiments illustrated in FIG. 3 should therefore not be interpreted to be exclusive or limiting, but rather illustrative.

Figure 4:
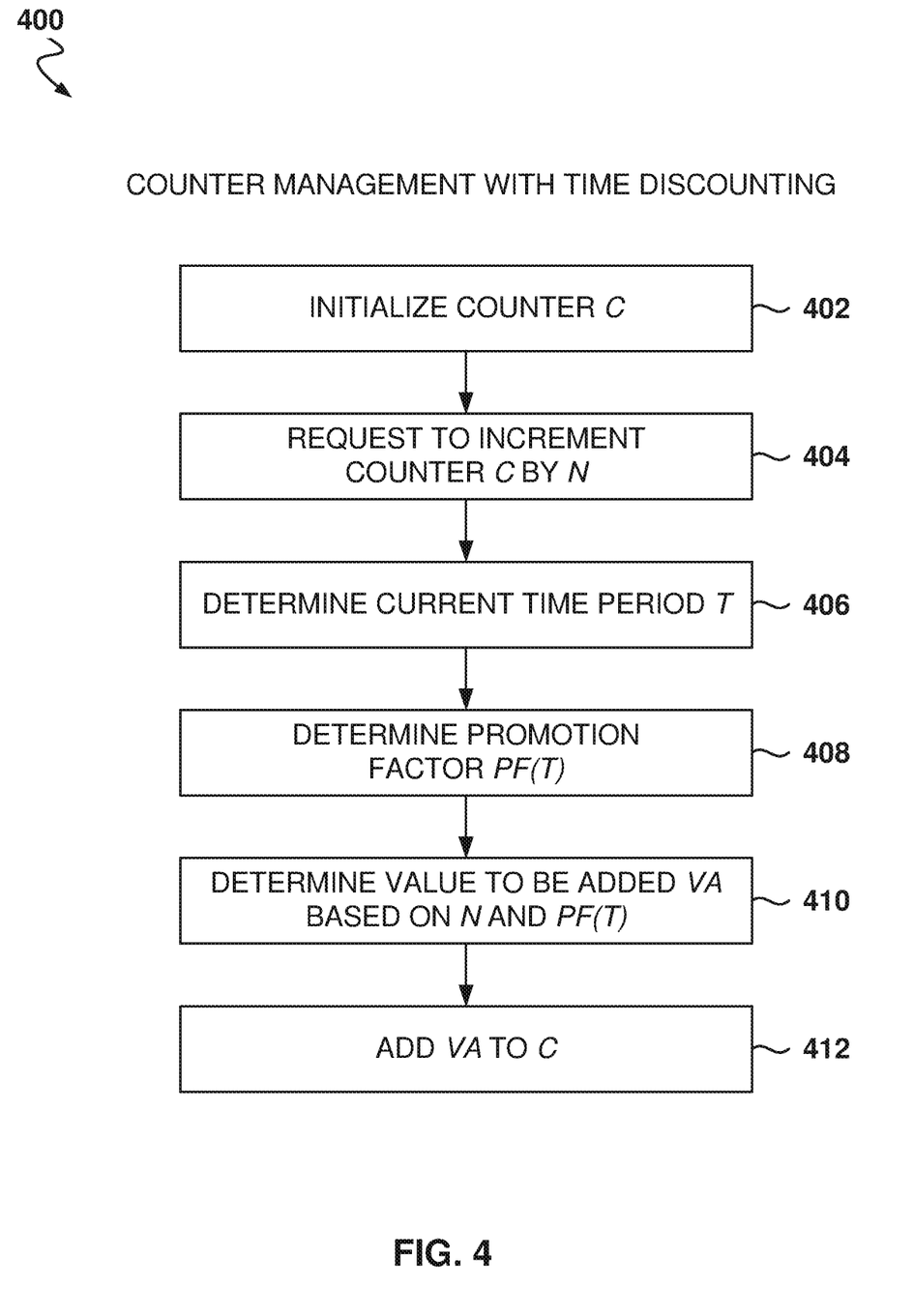
FIG. 4 is a flowchart of a method for counter management with time discounting, according to some example embodiments.

FIG. 4 is a flowchart of a method 400 for counter management with time discounting, according to some example embodiments. While the various operations in this flowchart are presented and described sequentially, one of ordinary skill will appreciate that some or all of the operations may be executed in a different order, be combined or omitted, or be executed in parallel.

At operation 402, a counter C is initialized, such as by setting the value of the counter to zero. From operation 402, the method flows to operation 404, where a request is received to increment the value of C by n. It is noted that C is not incremented directly by n, but by a modified value based on n and the current time, as described above.

From operation 404, the method flows to operation 406, where the current time period T is determined. In some example embodiments, T is calculated using equation (1) and depends on the time origin $t_0$ and the duration P of each period. In some examples, operation 406 is optional if the T for the current time period has already been calculated since the T is constant for the duration of the period. In some example embodiments, different counters may have different time origins and different periods.

In other example embodiments, time is not divided into periods, and T is equal to the current time, or a function of the current time. In this case, no calculation is required for T and the current tune is used for T.

At operation 408, the promotion factor NTT) is calculated based on T Some examples for calculating pf(T) are described above using equations (3) and (5)-(9).

From operation 408, the method flows to operation 410, where the value to be added va is calculated based on n and pf(T). For example, va is calculated with equation (4) as a multiplication of both factors, but other equations may also be utilized.

Further, at operation 412 the calculated value of va is added to the counter C. In some example embodiments, operation 412 involves a database command to add the value va to counter C. In other example embodiments, operation 412 may include adding the value va to a cached value of C kept in computer memory directly accessible by a processor.

Figure 5:
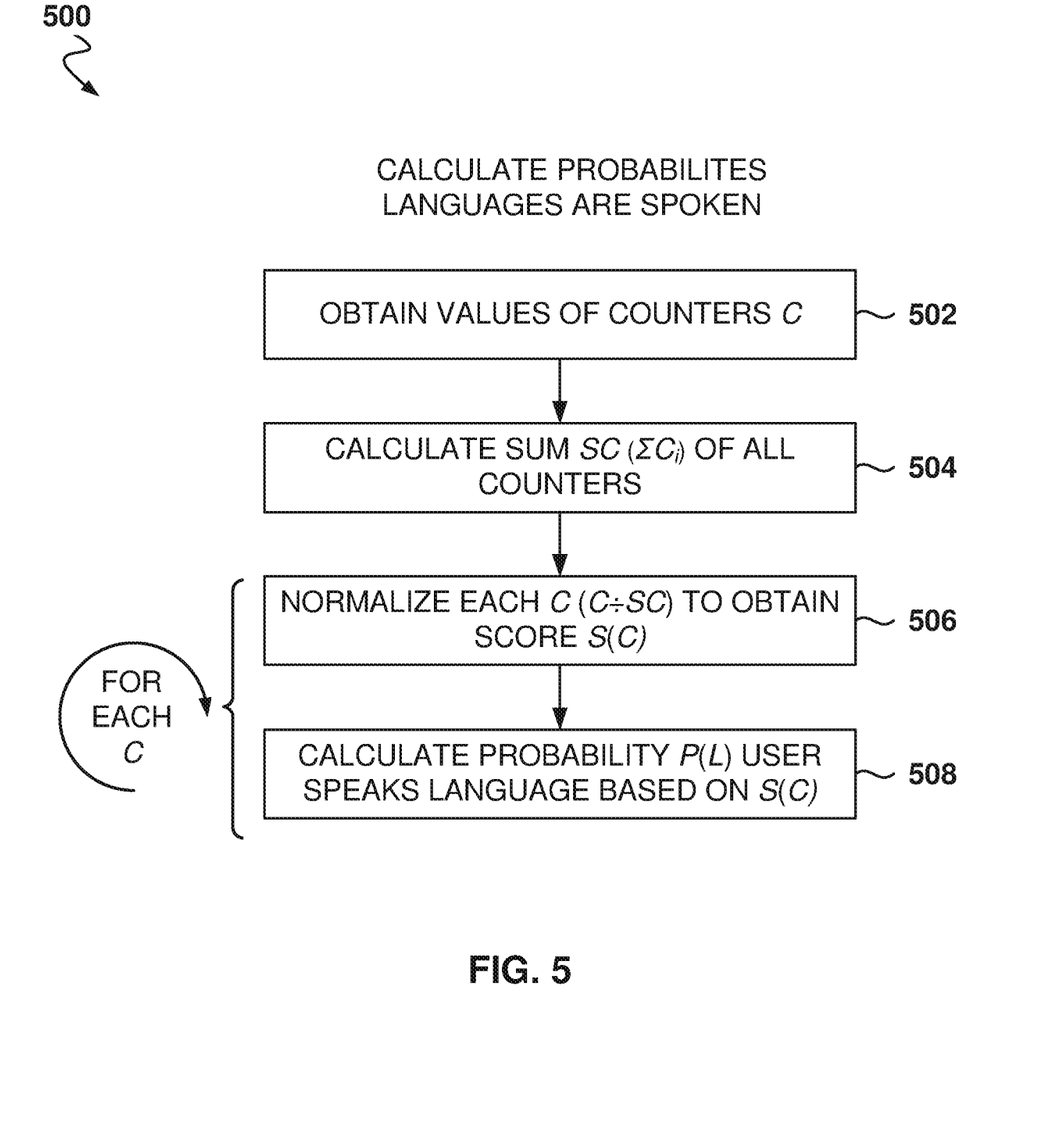
FIG. 5 is a flowchart of a method for calculating the probabilities that languages are spoken by a user, according to some example embodiments.

FIG. 5 is a flowchart of a method 500 for calculating the probabilities that languages are spoken by a user, according to some example embodiments. While the various operations in this flowchart are presented and described sequentially, one of ordinary skill will appreciate that some or all of the operations may be executed in a different order, be combined or omitted, or be executed in parallel.

When a user first joins the online service, there may not be a history of the user to determine which languages are spoken. Therefore, at first, heuristics may be utilized to determine fluency in one or more languages, such as place of birth, city where the user resides, languages used for education, and so forth. Eventually, as more information is gathered about the user based on the user interactions with the online service, the heuristic methods may be discarded, or minimized, and the language, or languages, used by the user will be used to determine fluency.

At operation 502, the values of the counters C associated with the languages are obtained, such as by reading the counters C from a database or a computer memory.

In some example embodiments, the values of the counters are normalized before determining languages spoken by the user. At operation 504, the sum SC of all the counters is calculated. In some example embodiments, a. threshold is determined and the counters that are below the threshold are discarded. For example, counters with a value of zero or a very small value may represent noise regarding the language spoken, so these counters may be discarded at this point. This means that the corresponding languages are discarded as a. possibility.

Operations 506 and 508 are performed for each different counter. At operation 506, the normalized value of each counter is calculated as the current value of the counter divided by the sum SC of all the counters.

At operation 508, the probability P(L) that the corresponding language L, associated with the counter C, is spoken by the user is calculated. In some example embodiments, a threshold is utilized to determine which languages are spoken, such that counters with a value above the threshold respond to languages spoken by the user, while counters below the threshold respond to languages not spoken by the user. Of course, the threshold is set such that at least one language is spoken by the user.

Identifying the language spoken by the user is used in different scenarios. First, identifying the language spoken by the user, based on historical use of one or more languages (e.g., writing posts, reading articles, in-network messages, etc.), helps determining the language used when writing, such as a post in the user feed.

Knowing the language used to write the post (or anything else in the social network) improves the accuracy in determining the meaning of the post, and reduces the amount of computer resources used in determining the meaning of the post. Knowing the meaning of the post helps the social network identify other users that might be interested in the post (which speak the language identified in the post). Further, knowing the language allows the social network to help the user as the user writes the post, such as by providing suggestions on words that could be added, checking spelling to identify possible mistakes, checking grammar, etc.

Further, the use of counters in a conversation, between two people or within a group, helps determine the language or languages being spoken in the conversation. Again, this helps predicting the language used in the next comment and enables the ability to provide services when writing the comment, such as translation services to other languages, help with grammar and spelling, providing suggestions for possible responses, etc.

Further yet, the use of counters to identify the language, or languages, spoken by the user can identify items being viewed by the user that are presented in a language not spoken by the user. In this case, translation services may be offered to translate the identified items.

Furthermore, knowing the language used by the user assists in selecting items that may be presented on the user feed. For example, rules may be used to select content. For example, the ranking score of one item for the feed may be increased when the user speaks the language of the item and decreased when the user does not speak the language. Another rule may prohibit items in languages not spoken by the user to be presented in the user feed. Further yet, the model used by the feed-ranking mechanism may use the language of the item, as well as the language or languages spoken by the user, as features for ranking, such as, "how does a language mismatch affect the click probability on this content?"

Figure 6:
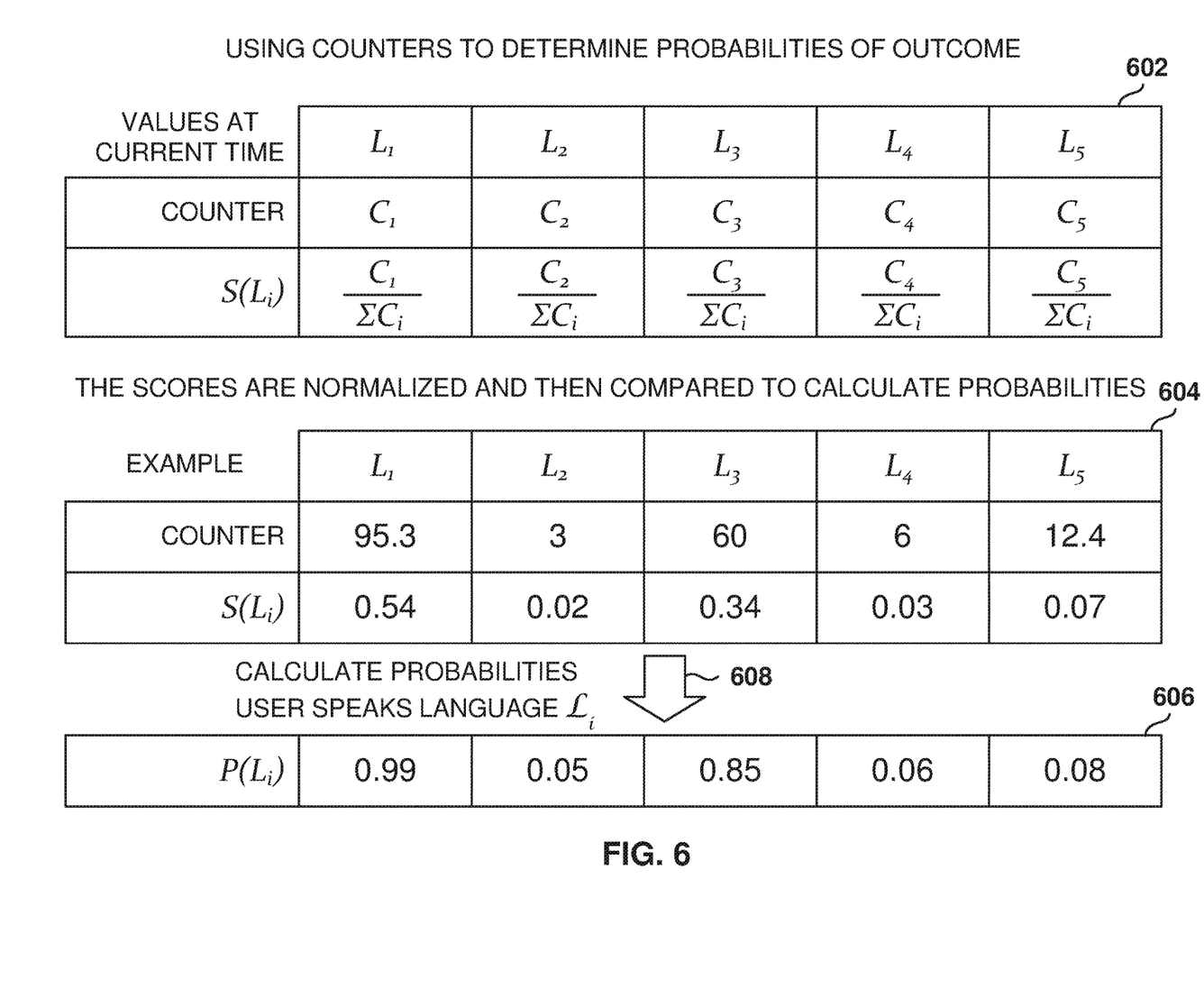
FIG. 6 illustrates using counters to determine probabilities for different possible outcomes, according to some example embodiments.

FIG. 6 illustrates using counters to determine probabilities for different possible outcomes, according to some example embodiments. FIG. 6 illustrates an example for determining which of five languages a user speaks. Although the example is for five languages, the principles presented may be used for any number of languages.

Table 602 shows the values of the counters at the current time. The first column indicates which data is stored in each of the rows and the remainder of the columns are to store the values for each language $L_i$. The first row holds the column headers for the different languages, the second row holds the value of the counters and $C_i$, the third row shows the equations for calculating the normalized values of the counters, also referred to as the scores $S(L_i)$. Thus $S(L_i)$ is calculated as $C_i/\Sigma C_i$.

Table 604 shows the current values of the counters and the respective scores. Thus, $C_1$ is 95.3, $C_2$ is 3, $C_3$ is 60, etc. The sum of all the counters is 176.7. The score for a $S(L_1)$ is 0.54, $S(L_2)$ is 0.02, $S(L_3)$ is 0.34, and so forth.

At operation 608, the respective probabilities that the user speaks the language $L_i$ is calculated based on the scores $S(L_i)$. In this example, $L_1$ and $L_3$ have higher scores than $L_2$, $L_4$, and $L_5$. A probability is assigned based on the $S(L_i)$, and $P(L_1)$ is 99%, $P(L_2)$ is 5%, $P(L_3)$ is 85%, and so forth. Therefore, the user probably speaks $L_1$ and $L_3$. Table 606 shows the values for $P(L_i)$.

In the example mentioned above, where a user enters a text message "yo," if the user has a high probability of speaking Spanish and a low probability of speaking English, then it can be assumed that the message has a high probability of being in Spanish and means "I," instead of a colloquial English sentence.

Figure 7:
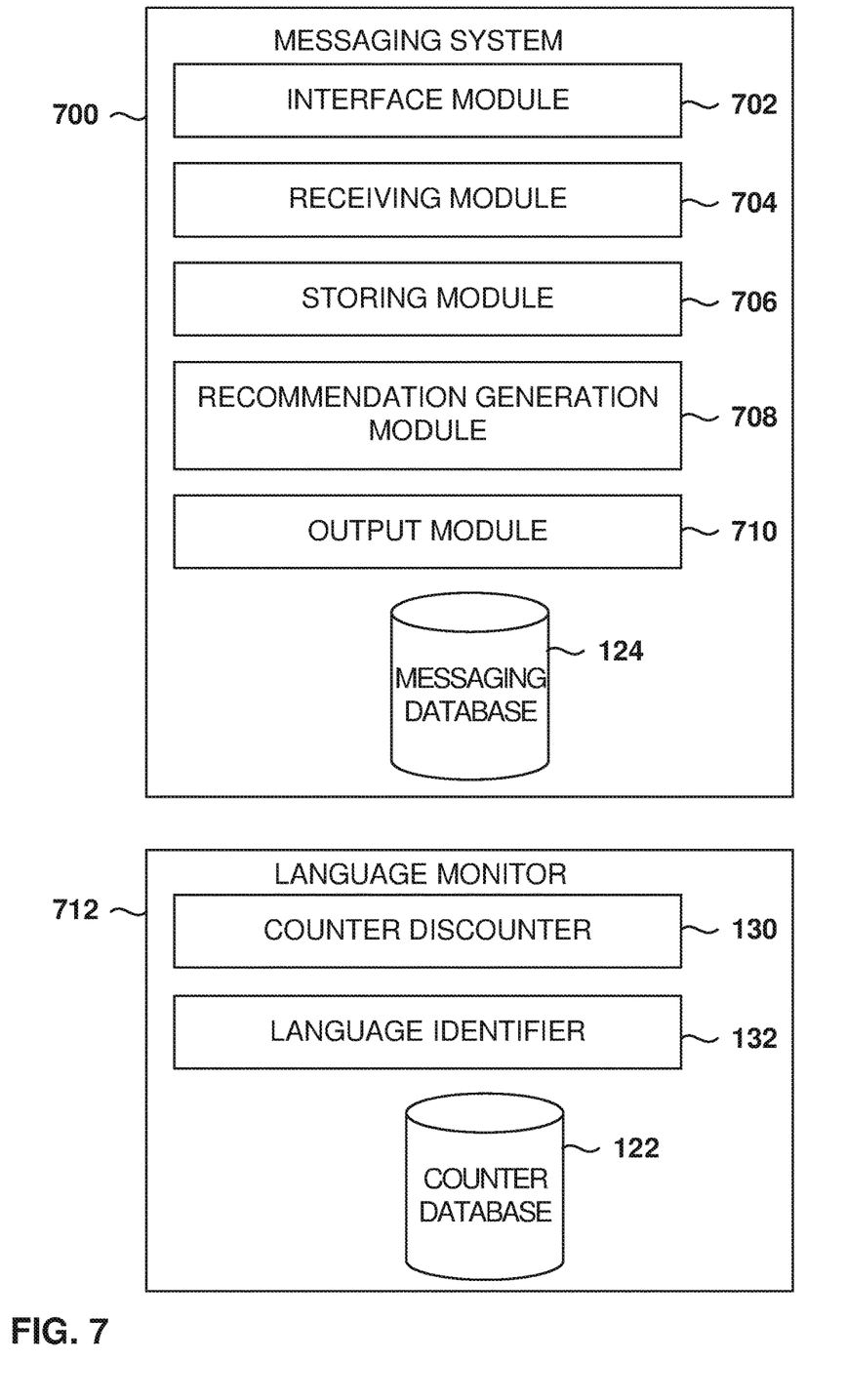
FIG. 7 shows a messaging system and a language identifier, according to some example embodiments.

FIG. 7 shows a messaging system 700 and a language monitor 712, according to some example embodiments. To avoid obscuring the inventive subject matter with unnecessary detail, various functional components (e.g., modules) that are not germane to conveying an understanding of the inventive subject matter have been omitted from FIG. 7. However, a skilled artisan will readily recognize that various additional functional components may be supported by the messaging system 700 and the language monitor 712 to facilitate additional functionality that is not specifically described herein. Furthermore, the various functional modules depicted in FIG. 7 may reside on a single computing device or may be distributed across several computing devices in various arrangements such as those used in cloud-based architectures.

The messaging system 700 includes an interface module 702, a receiving module 704, a storing module 706, a recommendation generation module 708, an output module 710, and a messaging database 124. The interface module 702 provides a messaging interface that enables users to initiate and participate in communication sessions with other users. For example, the messaging interface includes user interface elements (e.g., buttons, scrollbars, text fields, etc.) that enable a user to select users and draft messages to initiate and participate in a communication session. Further, the messaging interface presents the users with a listing of available contacts to include in a communication session. The messaging interface also presents the user with a listing of existing communication sessions, which a user can select from to read the previous messages transmitted as part of the communication session as well as to draft and send new messages as part of the communication session.

The receiving module 704 receives messages that are being transmitted as part of a communication session. The messages are received from the client device of an originating user and intended for one or more other client devices of recipient users in the communication session.

The storing module 706 stores message data consisting of the received messages along with associated metadata in the messaging database 124. The storing module 706 may store the messaging data in the messaging database 124. In some embodiments, the storing module 706 anonymizes the message data. to protect the privacy of the users. For example, the storing module 706 removes names and other personal information from the message data. The storing module 706 may also store the message data for a limited period, after which the message data is deleted. In some embodiments, a user may opt in or opt out of having their message data stored by the storing module. Accordingly, users who do not want to have their message data stored can opt out, resulting in the storing module 706 not storing their message data The recommendation generation module 708 generates recommended responses based on a received message and the historical message data stored in the messaging database 124. The recommendation generation module 708 uses the historical message data to generate a statistical model, such as a shallow embedding model, which is used to determine recommended responses based on a received message. For example, upon receiving a message from a client device, the recommendation generation module 708 uses the received message as input in the statistical model, which results in a set of candidate responses to the message. The recommendation generation module 708 then selects a set of recommended responses from the set of candidate response, which can be provided to a user.

The output module 710 transmits received messages and a set of recommended responses to a recipient user's client device as part of a communication session. The recipient user can select a recommended response to quickly and easily respond to the received message.

The language monitor 712 includes a counter discounter 130, a. language identified 132, and a counter database 122 that stores values of the counters. In some example embodiments, some of the counters are counters with time discounting, as described above.

The counter discounter 130 manages updates (e.g., increments) to the counters, and the counter discounter 130 applies the promotion factor to the received updates based on the current time or the time at which the increment request was generated. The counter discounter 130 then generates database commands to update the counters in the counter database 122. In some example embodiments, the database command is for adding a provided value to a named counter in the counter database 122.

The language identifier 132 periodically determines the probability that the user speaks one or more languages. The language identifier 132 reads the counters from the counter database 122 and determines probabilities that the user speaks several languages. See, for example, the calculation of probabilities described above with reference to FIG. 6.

Figure 8:
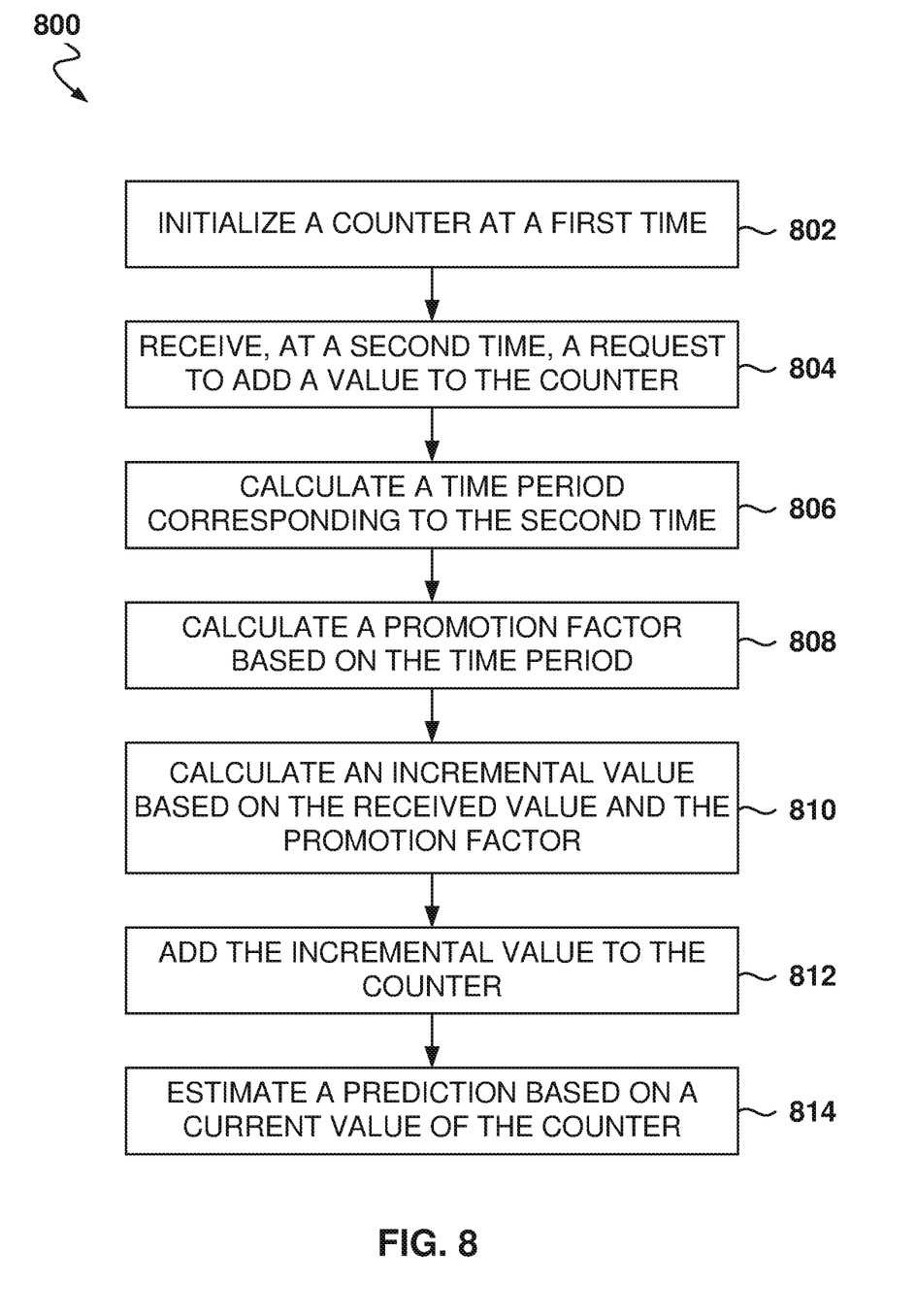
FIG. 8 is a flowchart of a method for managing counters with automatic obsolescence of outdated values, according to some example embodiments.

FIG. 8 is a flowchart of a method 800 for managing counters with automatic obsolescence of outdated values, according to some example embodiments. While the various operations in this flowchart are presented and described sequentially, one of ordinary skill will appreciate that some or all of the operations may be executed in a different order, be combined or omitted, or be executed in parallel.

At operation 802, a counter is initialized at a first time by one or more processors. From operation 802, the method 800 flows to operation 804 for receiving, at a second time, a request to add a value to the counter.

From operation 804, the method 800 flows to operation 806 where the one or more processors calculate a time period corresponding to the second time. At operation 808, the one or more processors calculate a promotion factor based on the time period.

From operation 808, the method 800 flows to operation 810 where the one or more processors calculate an incremental value based on the received value and the promotion factor.

At operation 812, the one or more processors add the incremental value to the counter. Further, at operation 814, the one or more processors estimate a prediction based on a current value of the counter.

In one example, the counter is stored in a database, and updating the counter based on the received value does not require reading the counter from the database.

In one example, increments entered at older times have lower promotion factors than increments added at more recent times.

In one example, calculating the promotion factor includes making the promotion factor equal to a constant to the power of the time period, the constant being greater than one.

In one example, calculating the time period includes calculating a time difference equal to the second time minus a time origin and making the time period equal to the time difference module a predetermined time duration.

In one example, calculating the incremental value comprises making the incremental value equal to the received value multiplied by the promotion factor.

in one example, the counter is one from a plurality of counters, wherein estimating the prediction comprises accessing, from a database, values of the plurality of counters, and calculating normalized values for the plurality of counters.

In one example, estimating the prediction further comprises estimating the prediction by comparing the calculated normalized values for the plurality of counters.

In one example, each counter from the plurality of counters is for counting a number of interactions by a user in a respective language, and estimating the prediction further comprises predicting languages spoken by the user based on the calculated normalized values for the plurality of counters.

In one example, each counter from the plurality of counters is for counting a number of text messages within a messaging group in a respective language, and estimating the prediction further comprises predicting languages spoken within the messaging group based on the calculated normalized values for the plurality of counters.

Another embodiment is for a system that includes a memory comprising instructions and one or more computer processors. The instructions, when executed by the one or more computer processors, cause the one or more computer processors to perform operations comprising: initializing a counter at a first time; receiving, at a second time, a request to add a value to the counter; calculating a time period corresponding to the second time; calculating a. promotion factor based on the time period; calculating an incremental value based on the received value and the promotion factor; adding the incremental value to the counter; and estimating a prediction based on a current value of the counter.

In yet another embodiment, a machine-readable storage medium (e.g., a non-transitory storage medium) includes instructions that, when executed by a machine, cause the machine to perform operations comprising: initializing a counter at a first time; receiving, at a second time, a request to add a value to the counter; calculating a time period corresponding to the second time; calculating a promotion factor based on the time period; calculating an incremental value based on the received value and the promotion factor; adding the incremental value to the counter; and estimating a prediction based on a current value of the counter.

Figure 9:
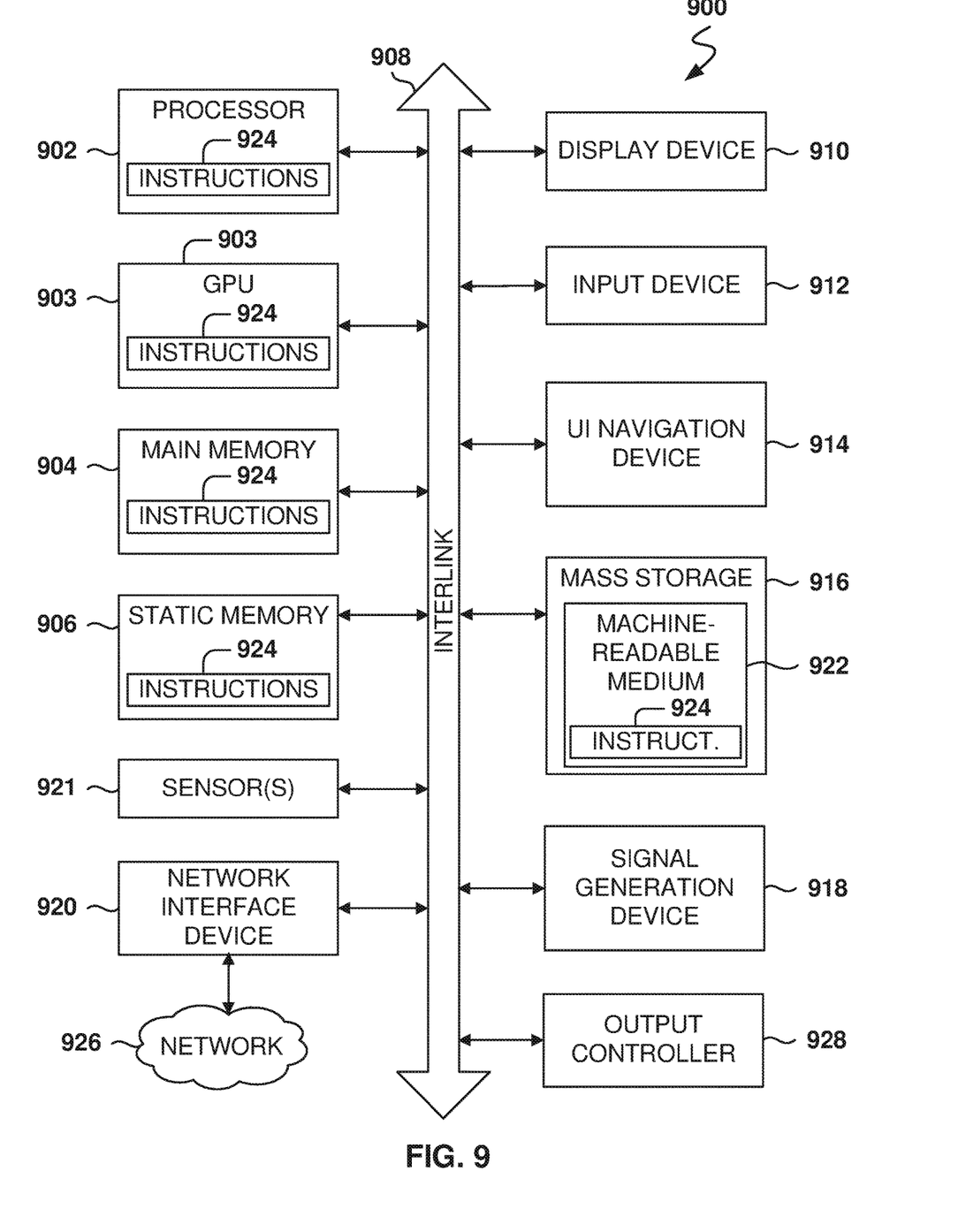
FIG. 9 is a block diagram illustrating an example of a machine upon or by which one or more example process embodiments described herein may be implemented or controlled.

FIG. 9 is a block diagram illustrating an example of a machine 900 upon or by which one or more example process embodiments described herein may be implemented or controlled. In alternative embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in a peer-to-peer (P2P) (or other distributed) network environment. Further, while only a single machine 900 is illustrated, the term "machine" shall also be taken to include any collection of machines 900 that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, by moveable placement of invariant massed particles, etc.) to encode instructions of the specific operation. In connecting the physical components, the underlying electrical properties of a hardware constituent are changed (for example, from an insulator to a conductor or vice versa). The instructions enable embedded hardware (e.g., the execution units or a. loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 900 may include a hardware processor 902 (e.g., a central processing unit (CPU), a hardware processor core, or any combination thereof), a graphics processing unit (GPU) 903, a main memory 904, and a static memory 906, some or all of which may communicate with each other via an interlink (e.g., bus) 908. The machine 900 may further include a display device 910, an alphanumeric input device 912 (e.g., a keyboard), and a user interface (UI) navigation device 914 (e.g., a mouse). In an example, the display device 910, alphanumeric input device 912, and UI navigation device 914 may be a touch screen display. The machine 900 may additionally include a. mass storage device (e.g., drive unit) 916, a signal generation device 918 (e.g., a speaker), a network interface device 920, and one or more sensors 921, such as a GPS sensor, compass, accelerometer, or another sensor. The machine 900 may include an output controller 928, such as a serial (e.g., universal serial bus (USB)), parallel, or other wired or wireless (e.g., infrared (IR), near field communication (NEC), etc.) connection to communicate with or control one or more peripheral devices (e.g., a printer, card reader, etc.).

The mass storage device 916 may include a machine-readable medium 922 on which is stored one or more sets of data structures or instructions 924 (e.g., software) embodying or utilized by any one or more of the techniques or functions described herein. The instructions 924 may also reside, completely or at least partially, within the main memory 904, within the static memory 906, within the hardware processor 902, or within the GPU 903 during execution thereof by the machine 900. In an example, one or any combination of the hardware processor 902, the GPU 903, the main memory 904, the static memory 906, or the mass storage device 916 may constitute machine-readable media 922.

While the machine-readable medium 922 is illustrated as a single medium, the term "machine-readable medium" may include a single medium, or multiple media, (e.g., a centralized or distributed database, and/or associated caches and servers) configured to store the one or more instructions 924.

The term "machine-readable medium" may include any medium that is capable of storing, encoding, or carrying instructions 924 for execution by the machine 900 and that cause the machine 900 to perform any one or more of the techniques of the present disclosure, or that is capable of storing, encoding, or carrying data structures used by or associated with such instructions 924. Non-limiting machine-readable medium 922 examples may include solid-state memories, and optical and magnetic media. In an example, a massed machine-readable medium comprises a machine-readable medium 922 with a plurality of particles having invariant (e.g., rest) mass. Accordingly, massed machine-readable media are not transitory propagating signals. Specific examples of massed machine-readable media may include non-volatile memory, such as semiconductor memory devices (e.g., electrically programmable read-only memory (EPROM), electrically erasable programmable read-only memory (EEPROM)) and flash memory devices; magnetic disks, such as internal hard disks and removable disks; magneto-optical disks; and CD-ROM and DVD-ROM disks.

The instructions 924 may further be transmitted or received over a. communications network 926 using a transmission medium via the network interface device 920.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
    initializing, by one or more processors, a counter at a first time;
    receiving, by the one or more processors at a second time, a request to add a value to the counter;
    calculating, by the one or more processors, a time period corresponding to the second time;
    calculating, by the one or more processors, a promotion factor based on the time period corresponding to the second time;
    calculating, by the one or more processors, an incremental value for incrementing the counter based on the received value and the promotion factor;
    adding, by the one or more processors, the calculated incremental value to the counter; and
    estimating, by the one or more processors, a prediction based on a current value of the counter.

2. The method as recited in claim 1, wherein the counter is stored in a database, wherein adding the incremental value to the counter comprises:
    sending a request to the database to add the incremental value to the counter without reading the counter from the database.

3. The method as recited in claim 1, wherein increments entered at older times have lower promotion factors than increments added at more recent times.

4. The method as recited in claim 1, wherein calculating the promotion factor includes:
    making the promotion factor equal to a constant to the power of the time period, the constant being greater than one.

5. The method as recited in claim 1, wherein calculating the time period includes:
    calculating a time difference equal to the second time minus a time origin; and
    making the time period equal to the time difference module a predetermined time duration.

6. The method as recited in claim 1, wherein calculating the incremental value comprises:
    making the incremental value equal to the received value multiplied by the promotion factor.

7. The method as recited in claim 1, wherein the counter is one from a plurality of counters, wherein estimating the prediction comprises:
    accessing, from a database, values of the plurality of counters; and
    calculating normalized values for the plurality of counters.

8. The method as recited in claim 7, wherein estimating the prediction further comprises:
    estimating the prediction by comparing the calculated normalized values for the plurality of counters.

9. The method as recited in claim 8, wherein each counter from the plurality of counters is for counting a number of interactions by a user in a respective language, wherein estimating the prediction further comprises:
    predicting languages spoken by the user based on the calculated normalized values for the plurality of counters.

10. The method as recited in claim 9, further comprising:
    filtering content presented to the user based on the languages spoken by the user.

11. The method as recited in claim 9, further comprising:
    offering translation services when the user does not speak a language of an item presented to the user.

12. The method as recited in claim 8, wherein each counter from the plurality of counters is for counting a number of text messages within a messaging group in a respective language, wherein estimating the prediction further comprises:
    predicting languages spoken within the messaging group based on the calculated normalized values for the plurality of counters.

13. The method as recited in claim 12, further comprising:
    providing suggestions for possible responses in the messaging group.

14. The method as recited in claim 12, further comprising:
    spellchecking a message, within the messaging group, based on the languages spoken within the messaging group.

15. A system comprising:
    a memory comprising instructions; and
    one or more computer processors, wherein the instructions, when executed by the one or more computer processors, cause the one or more computer processors to perform operations comprising:
        initializing a counter at a first time;
        receiving, at a second time, a request to add a value to the counter;
        calculating a. time period corresponding to the second time;
        calculating a promotion factor based on the time period corresponding to the second time;
        calculating an incremental value for incrementing the counter based on the received value and the promotion factor;
        adding the calculated incremental value to the counter; and
        estimating a prediction based on a current value of the counter.

16. The system as recited in claim 15, wherein the counter is stored in a database, wherein adding the incremental value to the counter comprises:
    sending a request to the database to add the incremental value to the counter without reading the counter from the database.

17. The system as recited in claim 15, wherein calculating the promotion factor includes:

making the promotion factor equal to a constant to the power of the time period, the constant being greater than one.

18. The system as recited in claim 15, wherein calculating the time period includes:
    calculating a time difference equal to the second time minus a time origin; and
    making the time period equal to the time difference module a predetermined time duration.

19. The system as recited in claim 15, wherein calculating the incremental value comprises:
    making the incremental value equal to the received value multiplied by the promotion factor.

20. A non-transitory machine-readable storage medium including instructions that, when executed by a machine, cause the machine to perform operations comprising:
    initializing a counter at a first time;
    receiving, at a second time, a request to add a value to the counter;
    calculating a time period corresponding to the second time;
    calculating a promotion factor based on the time period corresponding to the second time;
    calculating an incremental value for incrementing the counter based on the received value and the promotion factor;
    adding the calculated incremental value to the counter; and
    estimating a prediction based on a current value of the counter.

* * * * *

UNITED STATES PATENT AND TRADEMARK OFFICE
CERTIFICATE OF CORRECTION

PATENT NO. : 11,017,046 B2
APPLICATION NO. : 16/297817
DATED : May 25, 2021
INVENTOR(S) : Jeffrey William Pasternack Page 1 of 1

It is certified that error appears in the above-identified patent and that said Letters Patent is hereby corrected as shown below:

In the Claims

In Column 16, Line 49, in Claim 15, delete "a." and insert --a-- therefor

Signed and Sealed this
Tenth Day of August, 2021

Drew Hirshfeld
*Performing the Functions and Duties of the*
*Under Secretary of Commerce for Intellectual Property and*
*Director of the United States Patent and Trademark Office*